Patented May 6, 1952

2,595,825

UNITED STATES PATENT OFFICE 2,595,825

SOLVENT EXTRACTION OF VEGETABLE OILS

Walter H. Williamson, Indian Hill, Ohio, assignor to The Procter and Gamble Company, Ivorydale, Ohio, a corporation of Ohio No Drawing. Application May 13, 1949, Serial No. 93,189

8 Claims. (Cl. 260—412.4)

The present invention relates to the solvent extraction of oil from cottonseed, and more particularly to improvements in extraction processes involving the passage through a bed of comminuted cottonseed meats of a solvent or solvent mixture having affinity for water-soluble substances contained in said meats.

In the process of extracting oil from cottonseed meats described and claimed in U. S. Patent 2,484,831, granted October 18, 1949, in which I am joint inventor, a single phase mixture of hydrocarbon solvent and methanol is employed as the extracting medium to yield an improved extracted meal. In the operation of this process, wherein the solvent mixture is allowed to drain through a bed of flaked cottonseed meats, I have observed that an immediate swelling of the meat particles, amounting to as much as 10 per cent to 15 per cent, takes place on contact with the solvent. Such swelling is apparently due to the presence of the methanol in the solvent mixture. Methanol, however, is not singular in this respect; corresponding oil extraction solvent mixtures containing other water-miscible solvents, such as ethanol, propanol, dioxane, acetone, and the like, having appreciable affinity for water-soluble substances contained in the cotton seed will also cause such swelling. In addition it is to be observed that acetone and dioxane, for example, which per se may be used to extract oil (not in admixture with hydrocarbon solvents), also produce swelling when so used. The immediate result of the swelling is a reduction of existing interstices in the meat bed and a corresponding reduction in the solvent drainage rate. In addition, at the end of the extraction period, the swollen charge of residual meats is difficult to discharge cleanly from its container by simple inversion.

In an extraction procedure such as that under consideration here, thin flakes are of course desirable so that extraction of oil by the extraction solvent may be rapid and substantially complete. However, the thinner the flake, the greater is its fragility; the greater is the proportion of fines (particles less than 20 mesh in size) developed by handling the flaked product; the lower is its stability against collapse during extraction; the more completely are the limited number of interstices eliminated by particle swelling; and the slower the extraction solvent drains through the bed of flakes. Impractical rates of drainage are observed with desirably thin flakes unless channeling occurs, and of course with channeling adequate accessibility of the extraction solvent to the oil-containing cells of the flaked meats is not achieved, and inefficient extraction results.

Heretofore desired drainage without substantial channeling has been achieved by flaking the meats to a controlled thickness which is penetrable, although to less than an optimum degree, by the extraction solvent, but which imparts structural stability to the flakes thereby minimizing not only breakdown during handling to form fines but also collapse of the flakes during extraction. Reduction in the number of interstices is thereby also minimized and the effect of the above referred to particle swelling is not so pronounced. In general, present commercial practice of gravity percolation with methanolhydrocarbon extraction solvent on flaked cottonseed meats tolerates a variation in flake thickness of narrow range, for example from about .012 inch to about .016 inch, and fines are preferably controlled to a content not substantially more than 10 per cent. In order that such close limits may be realized, accurate control of the preparation of the seed for flaking, including control of meat moisture, per cent hulls in meats, and the like must be practiced. Even though such accurate control may be followed, oil yield is lower than that obtainable with the use of thinner flakes.

The primary object of the present invention is to improve oil yield in cottonseed extraction processes involving the percolation through a bed of flaked cottonseed meats of an extraction solvent or solvent mixture having appreciable affinity for water-soluble substances contained therein. Another object is to improve conditions of drainage in such extraction processes with improvement in oil yield. A further object is to reduce adverse effects of meat swelling occasioned by the use of such extraction solvents or solvent mixtures. Other objects will be apparent from the following description.

In accordance with the present process, the flaked cottonseed meats (including fines) are wetted with a prewetting agent consisting at least in part of an organic water-miscible solvent having affinity for water-soluble constituents of the meats to produce a slurry of solvent and flakes before the flake bed is formed in the extraction apparatus and before the main extraction procedure is started. Physical changes in the flakes, such as the swelling occurring on contact with the water-miscible solvent, thereupon take place before the bed of meats is formed in the extraction apparatus. Subsequent treatment in the main extraction step does not cause appreciable further swelling and reduction of interstices. Drainage is improved, channeling is thereby minimized, and more uniform contact of flake with extraction solvent during percolation, with more efficient removal of oil from the flaked meats, is realized. Moreover, the problem encountered in automatically dumping the extracted flakes from the meats containers of the extraction apparatus is virtually eliminated. The net result is that the use of my invention permits wider variations and less accurate control in flake preparation than heretofore, and a distinct advantage in extraction efficiency results from the permissible use of thinner flakes or flakes containing substantially more than 10 per cent fines. Greater oil production per unit of extraction apparatus may thereby be realized.

The present process will be more clearly understood from the following examples and subsequent description of permissible variations therein, and it is to be understood that the scope of the invention is not limited to specific details of the description but rather is defined by the boundaries of the appended claims.

*Example 1.*—Cotton seeds having a moisture content of about 13% were hulled in the normal manner and the recovered meats were heated to about 130° F. to condition them for flaking. The conditioned meats were then converted into flakes having a thickness averaging 0.008 inch. The content of fines averaged 9.8%.

Fifteen pounds of these flakes at 120° F. were prewetted by gently mixing with 4 gallons (about 24 pounds) of oil-solvent solution containing about 5% oil and about 95% of a mixture of 7½% methanol and 92½% hexane. Such an oil-solvent solution is obtainable by the washing of previously extracted meats with a methanol-hexane solution and is sometimes referred to as "half-miscella." The temperature of the solvent solution was 120° F. before admixture with the flakes. After about 3 minutes holding time, the slurry was charged to a basket type container slightly tapered from top to bottom and averaging about 9 inches wide, about 12 inches long and about 12 inches deep. The perforated bottom of the basket was designed to retain the charge of cottonseed meats during subsequent extraction without appreciably resisting the flow of solvent. Excess solvent used for pre-wetting was allowed to drain into a receiving tank and a bed of flakes about 10 inches thick remained in the basket.

In the present example the kind of solvent mixture used for extraction of oil was the same as that used for pre-wetting the flakes. From a storage tank 11 gallons (about 66 pounds) of the solvent at a temperature of 120° F. were conducted by gravity to a distributing device open to atmospheric pressure and positioned over the charge of meats in the basket. The solvent was admitted to the distributor from which the solvent drained over the meats at a rate such that the meats remained covered as long as solvent was being added. The length of time beginning with the addition of the solvent and ending when the last of the solvent had drained below the top surface of the flaked meat bed was noted. From this determination the average drainage rate was calculated. The average drainage rate for this charge was 4.2 gallons per minute per square foot of surface area of meats.

For comparison it is to be noted that in a corresponding run on another charge of the same meats which were not pre-wetted the drainage rate was less than one gallon per minute.

These results are also to be compared with those obtained in a corresponding run on non-prewetted flakes having a thickness averaging 0.013 inch and a fines content of 10.8, wherein the drainage rate was 4.1 gallons per minute.

From this example it is noted that the prewetting operation makes possible a reduction in flake thickness from 0.013 to 0.008 inch while at the same time retaining substantially the same drainage rate. The effect of this difference in flake thickness on the efficiency of recovery of oil from the respective meats at the same drainage rate is very marked. In an extraction procedure in which the prewetted flakes of 0.008 inch thickness and the non-prewetted flakes of 0.013 inch thickness respectively were contacted with the 11 gallon charge of half-miscella by recirculation for 30 minutes and then washed once with 20 gallons (about 110 lbs.) of fresh solvent at about 120° F., it was observed that a reduction in flake thickness from 0.013 inch to 0.008 inch effected a reduction in oil content of the flake residue amounting to almost 50%, that is from an average of 2.16% to an average of 1.12%.

These results may be summarized and tabulated as follows:

| Cottonseed Flakes | | Pre-wetting | Drainage Rate Gal./min. | Per Cent Oil in Meal after Extraction |
|---|---|---|---|---|
| Inches thickness | Per Cent Fines | | | |
| .008 | 9.8 | Yes | 4.2 | 1.12 |
| .008 | 9.8 | No | 1 | |
| .013 | 10.8 | No | 4.1 | 2.16 |

*Example 2.*—In a direct comparison conducted in accordance with the procedure of Example 1, except as indicated below, it was demonstrated that prewetting permits a much higher proportion of fines in the flaked meats as well as the use of thinner flakes without harmful effect on drainage rate. Flakes having a thickness of 0.013 inch and a fines content of 8.6% had a drainage rate of 4.11 gallons per minute without prewetting. When flakes of this same thickness but containing 25% fines were prewetted for 1½ minutes in accordance with Example 1, they drained at a rate of 7.95 gallons per minute. In a companion run, flakes having a thickness of 0.008 inch and a fines content of 15% drained at the rate of 4.76 gallons per minute when prewetted as in Example 1 for 1½ minutes.

These results may be summarized and tabulated as follows:

| Cottonseed Flakes | | Pre-wetting | Drainage Rate Gal./min. |
|---|---|---|---|
| Inches Thickness | Per Cent Fines | | |
| .013 | 8.6 | No | 4.11 |
| .013 | 25.0 | Yes | 7.95 |
| .008 | 15 | Yes | 4.76 |

The proportion of prewetting agent used in accordance with my invention is not critical and wide variation is permissible without interference with the success of the process. However, since the object of prewetting is to bring about certain physical changes in the meats prior to charging same to the basket of the extractor, and since these physical changes are at least in part brought about by intimate contact with solvents having affinity for water-soluble constituents of the meats, it is desirable for best results that the meats be uniformly and completely wetted in the prewetting operation with such solvent constituents of the prewetting agent. The proportion of prewetting agent required to achieve this end will depend on the manner of prewetting. For example, if the prewetting is effected solely with an extraction solvent, such as acetone, which has affinity for water-soluble constituents of the meats, it is preferable to use an amount in the neighborhood of at least one half the weight of the meats so that uniform and complete wetting is assured. However, when the prewetting agent is a mixture of solvents of which one solvent has the desired affinity for the water-soluble constituents of the meats, then the proportion of that one solvent relative to the meats may be considerably less than one half the weight of the meats, provided, however, that the total amount of the prewetting agent employed is sufficient to wet the meats uniformly and completely (at least one half the weight of the meats) and thus distribute the said one solvent throughout the meats. In the above example for instance the total weight of prewetting agent used was about 1.6 times the weight of the meats but the actual weight of methanol in the prewetting agent was only about 0.11 times the weight of the meats. Under such conditions of prewetting marked benefit will be observed with amounts of methanol as low as 0.05 times the weight of the meats.

As indicated above, it is permissible to effect prewetting with an agent which consists wholly of a solvent which has affinity for water-soluble materials in the meats, and then extract subsequently with any suitable oil solvent. For simplicity of operation, however, I have found that it is desirable to use as the prewetting agent the same solvent or solvent mixture as that employed in extraction, and to prewet with a sufficient amount to form a flowable slurry with the flaked meats which may then be transferred without difficulty from the prewetting stage to the subsequent extraction stage by simple gravity flow or with the aid of a screw conveyer for example. A 1:1 weight ratio of prewetting agent to meats has been found acceptable for this purpose. Larger amounts of prewetting agent may of course be employed without limit as far as realization of the advantages and objects of the invention is concerned.

The prewetting agent may be constituted of fresh (i. e. not previously used) solvent or solvent mixtures having affinity for water-soluble substances in the cottonseed meats, but this is not essential. A solution of oil in solvent such as that resulting from a previous extraction and containing from about 15 per cent to about 25 per cent oil (sometimes referred to in the industry as "full-miscella") or that resulting from the washing of extracted meats and containing around 5 per cent oil (half-miscella) may be employed as the prewetting agent without departing from the spirit of the invention. However, when previously used solvent mixtures are employed it is essential that the one component having affinity for water-soluble substances in the cottonseed meats be present in sufficient quantity to permit contact with all of the meats. Accordingly it may be desirable in some situations to add some of that component to the solvent mixture prior to use as the prewetting agent.

The manner of effecting the prewetting likewise is not critical. The prewetting agent may be added to and gently mixed with the flaked meats or the meats may be added to and gently stirred with the agent. Even continuous addition of the prewetting agent and meats to a suitable container from which the mixed slurry may be continuously removed may be practiced. It is to be noted, however, that the manner of mixing may depend on the proportion of agent used relative to the quantity of meats. This is especially true in the case of prewetting agents containing only minor amounts of the solvent having an affinity for the water-soluble materials in the flakes. Thus in the use of a prewetting agent made up of 92½ per cent hexane and 7½ per cent methanol it is preferable to add the flakes to the mixture of solvents unless the amount by weight of solvent mixture used is in excess of one part to one part of flakes. If low proportions of such solvent mixtures are employed as the prewetting agent, the methanol is in small amount relative to the meats, and pouring the solvent mixture over the flakes permits the removal of the methanol by the top layer of meats thereby leaving insufficient methanol in the mixture to effect contact with and prewetting of the lower layer of meats.

The time of contact of prewetting agent with the flaked meats during the prewetting step preceding conveyance to the extractor must be of sufficient duration to permit change in physical structure of the meats. This change proceeds at a rather rapid rate provided uniform contact of agent and meats is effected, and under practical conditions of operation the slurry may be conveyed almost immediately to the extractor. Within limits the drainage rate improves with increase in prewetting time but the advantage of prewetting times in excess of three minutes is very small. From a practical standpoint prewetting times from 90 to 180 seconds are sufficient to effect the desired change in flaked meat structure and to insure good drainage during subsequent extraction. Extended periods of contact are not harmful and the slurry may be held for periods up to 30 or more minutes if desired, before the contained meats are subjected to the main extraction procedure.

It is clear from the above description that the prewetting agent used in the present invention must consist, at least in part, of an organic water-miscible solvent having affinity for water-soluble substances in the meats. Among such solvents which fall within the scope of my invention and which may be used to replace the methanol used in the preceding examples are acetone, dioxane, or other oil extraction solvent which has affinity for water-soluble constituents of the cottonseed meats, or solvents such as ethanol or propanol, for example, which are not normally classed as oil extraction solvents but which are water-miscible and which have the desired affinity for the said water-soluble constituents. Such solvents may also be employed alone as the prewetting agent, or they may be used in admixture with each other, or in admixture with oil solvents which are not water-soluble to a very great degree such as heptane, hexane, pentane, benzene, ethyl ether, cyclohexane, commercial oil solvent mixtures which include 2-methyl pentane, 2-methyl butane, hexene, and heptene, as well as other oil solvents of value in oil extraction operations, such as chlorinated hydrocarbons, like ethylene dichloride, and solvents resulting from the polymerization of olefins, including diisobutylene and 2,4,4-trimethyl pentene-2.

As indicated above I have found that the step of prewetting as herein described and claimed has special utility in the extraction of cottonseed meats with a single-phase hydrocarbon-methanol solvent mixture as more particularly covered in the aforesaid U. S. Patent 2,484,831. The preferred solvent therein used is one containing (1) from 75 per cent to 98 per cent of an aliphatic hydrocarbon substantially volatilizable at temperatures below 220° F. and (2) from 25 per cent to 2 per cent of methanol. Operational problems encountered in the practice of that process, such as swelling of the meats in the container on addition of solvent, and attendant lower extraction efficiency and accompanying difficulties in automatically dumping the residue at the conclusion of extraction have been overcome by prewetting the meats with the same type of solvent mixture as that used in extraction.

The mechanics of the extraction procedure employed after effecting the prewetting step form no part of the present invention but, as indicated above, the utility of my contribution is outstanding in the case of those procedures in which the solvent percolates by gravity through a bed of the flaked cottonseed meats. Thus practice of the present invention finds particular advantages in basket type operations employing an extractor of the paternoster type wherein vertically disposed baskets each containing a bed of cottonseed flakes are treated with an oil extraction solvent having affinity for water-soluble substances in the meats, the solvent being allowed to percolate through the baskets in successive order. In such a process, therefore, separate beds of cottonseed flakes are subjected to transitory contact with the solvent as the extraction solvent percolates by gravity through successive beds. An example of an apparatus applicable in such a process is found in U. S. Patent 2,117,113, issued May 10, 1938 to Engler.

My invention has been described specifically in connection with the extraction of oil from meats which have been conditioned for flaking by heat treatment at about 130° F. Advantages also accrue in the use of my prewetting process in combination with extraction procedures applied to more thoroughly cooked, cottonseed meats wherein there is employed an extraction solvent or solvent mixture which at least in part has affinity for water-soluble constituents of the meats.

Having thus described my invention, what I claim and desire to secure by Letters Patent is:

1. In the extraction of oil from comminuted cottonseed meats by means of a volatile organic oil extraction solvent wherein a plurality of separate beds of flaked meats are subjected to contact with oil extraction solvent, the steps which comprise contacting the meats with a pre-wetting agent consisting at least in part of a water-miscible organic solvent having affinity for water-soluble substances in the meats to effect pre-wetting and swelling of the meats, forming the pre-wetted and swelled meats into a plurality of separate beds and thereafter passing successively through said beds an oil extraction solvent capable of extracting oil from said meats and comprising a water-miscible organic solvent having affinity for water-soluble substances in the meats.

2. In the process of extracting oil from flaked cottonseed meats by means of a solvent capable of extracting oil from said meats and comprising an organic solvent having affinity for water-soluble constituents of the meats, the steps of adding said flaked meats to an organic pre-wetting agent consisting at least in part of a volatile organic solvent having affinity for water-soluble constituents of said meats, thereby effecting initial wetting and swelling of the meats, forming a plurality of beds of the pre-wetted and swelled meats, draining excess pre-wetting agent from the meats and thereafter percolating said oil extraction solvent successively through said beds by gravity to effect extraction of contained oil.

3. The process of claim 1 in which the pre-wetting agent and the oil extraction solvent are the same.

4. The process of claim 1 in which prewetting is effected with an oil-solvent solution resulting from the extraction step.

5. The process of claim 1, in which the meats are contacted with an amount of prewetting agent not substantially less than one-half part by weight per one part by weight of meats.

6. The process of claim 1, in which the prewetting agent is a single phase solvent mixture essentially comprising methanol and an aliphatic hydrocarbon which is substantially completely volatilizable at a temperature substantially below 220° F.

7. The process of claim 1 in which the time of contact of meats and prewetting agent is not substantially less than 90 seconds and sufficient to permit swelling of the meats before the meats are formed into a bed.

8. In the extraction of oil from flaked cottonseed meats by means of a volatile organic oil extraction solvent wherein a plurality of separate beds of flaked meats are subjected to transitory contact with said extraction solvent as the solvent percolates by gravity through successive beds, the improvement which comprises prewetting the flaked cottonseed meats with a single-phase prewetting agent comprising from about 2 per cent to about 25 per cent methanol, allowing the prewetting agent and meats to remain in contact with each other for not substantially less than 90 seconds and for a period of time sufficient to permit swelling of the meats, then forming the prewetted and swelled meats into a plurality of separate beds vertically disposed with respect to each other, and thereafter percolating successively through said beds by gravity a single-phase oil extraction solvent mixture of (1) about 75 per cent to about 98 per cent of an aliphatic hydrocarbon substantially volatilizable at temperatures below 220° F. and (2) from about 25 per cent to about 2 per cent of methanol, thereby effecting extraction of oil from the meats.

WALTER H. WILLIAMSON.

REFERENCES CITED

The following references are of record in the file of this patent:

UNITED STATES PATENTS

| Number | Name | Date |
|---|---|---|
| 2,480,221 | Caplan | Aug. 30, 1949 |
| 2,484,831 | Hutchins et al. | Oct. 18, 1949 |
| 2,485,916 | Perez | Oct. 25, 1949 |
| 2,489,599 | Trottman | Nov. 29, 1949 |